(12) United States Patent
Tomi et al.

(10) Patent No.: US 6,811,834 B2
(45) Date of Patent: Nov. 2, 2004

(54) LIQUID CRYSTAL COMPOSITION AND LIQUID CRYSTAL DISPLAY ELEMENT

(75) Inventors: Yoshitaka Tomi, Ichihara (JP); Eiji Okabe, Ichihara (JP)

(73) Assignees: Chisso Petrochemical Corporation, Tokyo (JP); Chisso Corporation, Osaka (JP)

( * ) Notice: Subject to any disclaimer, the term of this patent is extended or adjusted under 35 U.S.C. 154(b) by 0 days.

(21) Appl. No.: 10/726,695

(22) Filed: Dec. 4, 2003

(65) Prior Publication Data

US 2004/0108490 A1 Jun. 10, 2004

(30) Foreign Application Priority Data

Dec. 4, 2002 (JP) ........................................ 2002-352261

(51) Int. Cl.[7] .......................... C09K 19/30; C09K 19/12
(52) U.S. Cl. ............... 428/1.1; 252/299.63; 252/299.66
(58) Field of Search ...................... 428/1.1; 252/299.63, 252/299.66

(56) References Cited

U.S. PATENT DOCUMENTS

| | | | |
|---|---|---|---|
| 5,961,881 A | 10/1999 | Andou et al. | 252/299.63 |
| 6,007,740 A | 12/1999 | Andou et al. | 252/299.63 |
| 6,315,922 B1 | 11/2001 | Takeshita et al. | 252/299.61 |
| 6,325,949 B1 | 12/2001 | Takeshita et al. | 252/299.63 |
| 6,497,929 B1 | 12/2002 | Miyairi et al. | 428/1.1 |
| 6,572,938 B2 | 6/2003 | Yanai et al. | 428/1.1 |
| 6,592,951 B2 * | 7/2003 | Heckmeier et al. | 428/1.1 |
| 6,753,046 B2 * | 6/2004 | Manabe et al. | 428/1.1 |

FOREIGN PATENT DOCUMENTS

WO 01/46336 6/2001

OTHER PUBLICATIONS

Patent Abstracts of Japan, 2001–003051, Jan., 2001.
Patent Abstracts of Japan, 2001–003053, Jan., 2001.
Patent Abstracts of Japan, 2001–123170, May, 2001.
Patent Abstracts of Japan, 2001–288470, Oct., 2001.

* cited by examiner

*Primary Examiner*—Shean C Wu
(74) *Attorney, Agent, or Firm*—Wenderoth, Lind & Ponack, L.L.P.

(57) ABSTRACT

The present invention provides a liquid crystal composition comprising four components, optionally five components, selected from the compounds (1) to (8), in which each compound represented by compounds (1) to (8) is defined in the specification. The invention further provides a liquid crystal display element comprising the composition.

36 Claims, No Drawings

LIQUID CRYSTAL COMPOSITION AND LIQUID CRYSTAL DISPLAY ELEMENT

BACKGROUND OF THE INVENTION

1. Field of the Invention

The present invention relates to a liquid crystal composition suitable for use mainly in an active matrix (AM) element, and an AM element comprising the composition.

2. Related Art

A liquid crystal display element is classified, based on an operating mode of a liquid crystal, into phase change (PC), twisted nematic (TN), super twisted nematic (STN), electrically controlled birefringence (ECB), optically compensated bend (OCB), in-plane switching (IPS), vertical alignment and the like. It is classified into passive matrix (PM) and active matrix (AM) based on a driving mode. PM is further classified into static, multiplex and the like, and AM is classified into thin film transistor (TFT), metal insular metal (MIM) and the like. TFT is further classified into amorphous silicon and polycrystal silicon. The latter is classified into a high temperature type and a low temperature type according to a production process. A liquid crystal display element is classified, based on a light source, into a reflection type utilizing a natural light, a transmission type utilizing a backlight and a semi-transmission type utilizing both.

These elements comprise a liquid crystal composition having suitable characteristics. To improve the general characteristics of the composition can lead to the production of an AM element having good general characteristics. The general characteristics of the composition are related with those of an AM element as summarized in Table 1. The general characteristics of the composition shall be explained further based on an AM element on the market. The temperature range of a nematic phase is related with the temperature range in which the element can be used. Desirable upper limit temperature of a nematic phase is 70° C. or more and desirable lower limit is −20° C. or less. The viscosity of the composition correlates with the response time of the element. A short response time is desirable for displaying a moving image. Accordingly, the composition desirably has low viscosity, and low viscosity at low temperature is more desirable.

TABLE 1

General characteristics of a liquid crystal composition and an AM element

| No. | General Characteristics of the Composition | General Characteristics of an AM Element |
|---|---|---|
| 1 | Wide temperature range of nematic phase | Available in wide temperature range |
| 2 | Low in viscosity[1)] | Short in response time |
| 3 | Suitable optical anisotropy | High in contrast ratio |
| 4 | Low in threshold voltage | Low in electric power consumption and high contrast ratio |
| 5 | High in specific resistance | High in voltage holding ratio and high contrast ratio |

[1)]The liquid crystal composition can be injected into a cell in a short time.

Optical anisotropy of the composition correlates with the contrast ratio of the element. To attain a maximum contrast ratio of the element, a product (Δn·d) of the optical anisotropy (Δn) of the composition and the cell gap (d) of the element should be designed to be approximately 0.45 μm. Accordingly, the optical anisotropy of the composition is mainly in the range of 0.08 to 0.12. Low threshold voltage of the composition contributes to low electric power consumption and high contrast ratio of the element. Accordingly, low threshold voltage is desirable. High specific resistance of the composition contributes to high voltage holding ratio and high contrast ratio of the element. Accordingly, a liquid crystal composition having high specific resistance in the initial stage is desirable. Further, it is desirable that the composition still has high specific resistance even after a long-term use.

A liquid crystal composition having lower threshold voltage is specifically desired for a transmission type AM element so that it is used at large contrast ratio and low electric power consumption. The conventional compositions are disclosed in the following patent documents; JP-A 10-204016/1998 (U.S. Pat. No. 6,007,740), JP-A 10-204436/1998 (U.S. Pat. No. 5,961,881), JP-A 3051/2001, JP-A 3053/2001, JP-A 123170/2001, JP-A 288470/2001 and WO 01/46336/1989.

SUMMARY OF THE INVENTION

The present invention comprises the following items A, B and C.

A. A liquid crystal composition comprising at least one compound selected from the compounds represented by formula (1) as a first component, at least one compound selected from the compounds represented by formulas (2) and (3) as a second component, at least one compound selected from the compounds represented by formulas (4) and (5) as a third component and at least one compound selected from the compounds represented by formulas (6) and (7) as a fourth component:

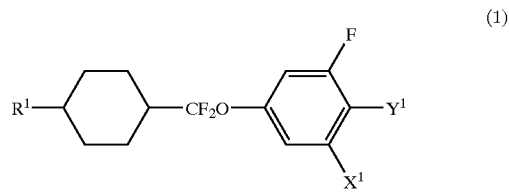

(1)

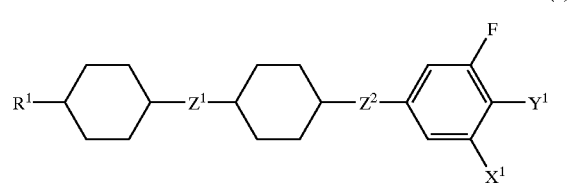

(2)

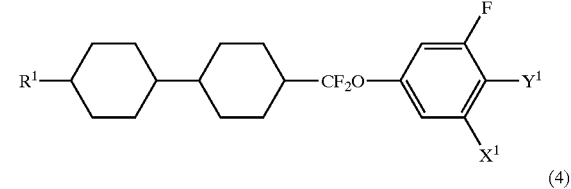

(3)

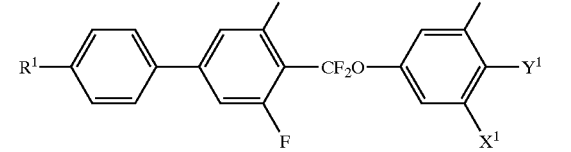

(4)

-continued

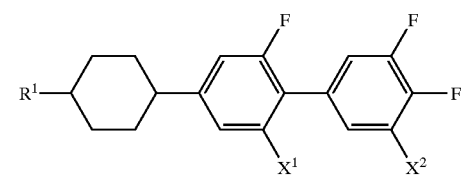
(5)

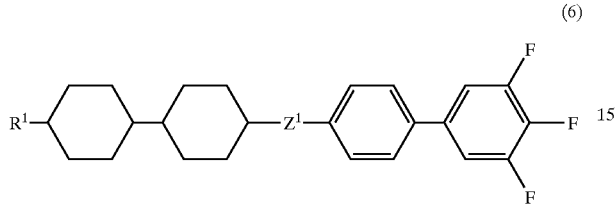
(6)

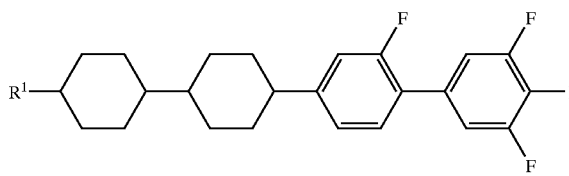
(7)

wherein, $R^1$ represents alkyl; $Z^1$ and $Z^2$ each independently represent a single bond or —(CH$_2$)$_2$—; $X^1$ and $X^2$ each independently represent hydrogen or fluorine; and $Y^1$ represents fluorine or —OCF$_3$.

B. A liquid crystal composition comprising at least one compound selected from the compounds represented by formula (2), at least one compound selected from the compounds represented by formula (3), at least one compound selected from the compounds represented by formula (4) and at least one compound selected from the compounds represented by formula (6):

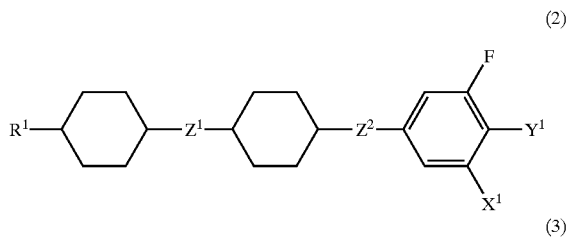
(2)

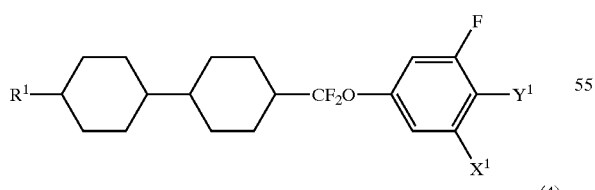
(3)

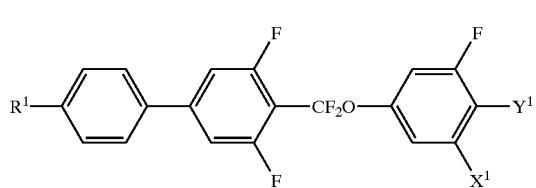
(4)

-continued

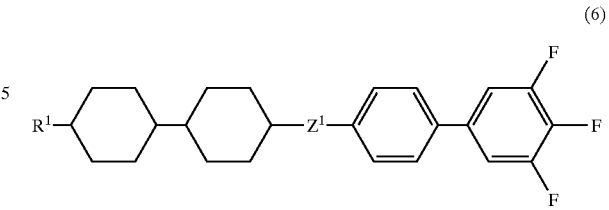
(6)

wherein, $R^1$ represents alkyl, $Z^1$ and $Z^2$ each independently represents a single bond or —(CH$_2$)$_2$—, $X^1$ represents hydrogen or fluorine, and $Y^1$ represents fluorine or —OCF$_3$.

C. A liquid crystal display element comprising the liquid crystal composition described above.

DETAILED DESCRIPTIONS

An object of the present invention is to provide a liquid crystal composition which can satisfy plurality of the characteristics, i.e., wide temperature range of a nematic phase, low viscosity, suitable optical anisotropy, low threshold voltage and high specific resistance. Another object is to provide a liquid crystal composition having plurality of these characteristics properly balanced. A further object is to provide a liquid crystal display element comprising such a composition. A still further object is to provide a transmission type AM element which comprises the composition having an optical anisotropy of 0.08 to 0.12, and has high contrast ratio, low electric power consumption and high voltage holding ratio.

The present invention comprises the following items 1 to 24:

1. A liquid crystal composition comprising at least one compound selected from the compounds represented by formula (1) as a first component, at least one compound selected from the compounds represented by formulas (2) and (3) as a second component, at least one compound selected from the compounds represented by formulas (4) and (5) as a third component and at least one compound selected from the compounds represented by formulas (6) and (7) as a fourth component:

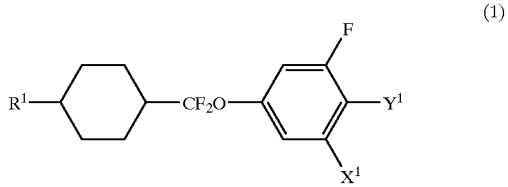
(1)

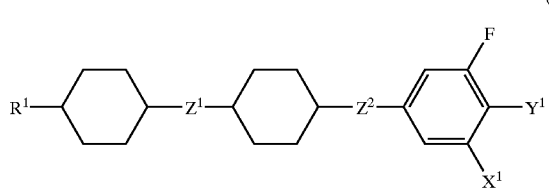
(2)

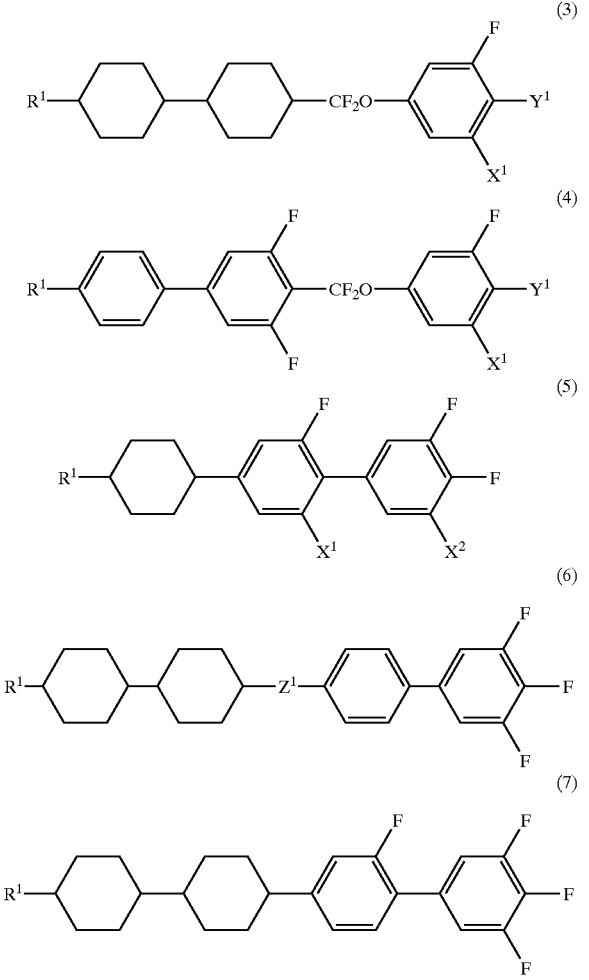

wherein, R¹ represents alkyl; Z¹ and Z² each independently represent a single bond or —(CH₂)₂—; X¹ and X² each independently represent hydrogen or fluorine; and Y¹ represents fluorine or —OCF₃.

2. The liquid crystal composition described in item 1, wherein the second component consists of at least one compound selected from the compounds represented by formula (2).

3. The liquid crystal composition described in item 1, wherein the second component consists of at least one compound selected from the compounds represented by formula (3).

4. The liquid crystal composition described in item 1, wherein the second component consists of at least one compound selected from the compounds represented by formula (2) and at least one compound selected from the compounds represented by formula (3).

5. The liquid crystal composition described in item 1, wherein the third component consists of at least one compound selected from the compounds represented by formula (4).

6. The liquid crystal composition described in item 1, wherein the third component consists of at least one compound selected from the compounds represented by formula (5).

7. The liquid crystal composition described in item 1, wherein the third component consists of at least one compound selected from the compounds represented by formula (4) and at least one compound selected from the compounds represented by formula (5).

8. The liquid crystal composition described in item 1, wherein the fourth component consists of at least one compound selected from the compounds represented by formula (6).

9. The liquid crystal composition described in item 1, wherein the fourth component consists of at least one compound selected from the compounds represented by formula (7).

10. The liquid crystal composition described in item 1, wherein the fourth component consists of at least one compound selected from the compounds represented by formula (6) and at least one compound selected from the compounds represented by formula (7).

11. The liquid crystal composition described in any of items 1 to 10 which contains 3 to 20% by weight of the first component, 40 to 80% by weight of the second component, 3 to 30% by weight of the third component and 5 to 30% by weight of the fourth component, each based on the total weight of the composition.

12. The liquid crystal composition described in any of items 1 to 11 which further comprises at least one compound selected from the compounds represented by formula (8) as a fifth component:

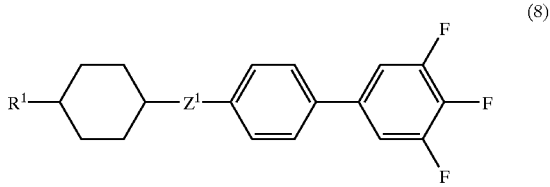

wherein R¹ represents alkyl; and Z¹ represents a single bond or —(CH₂)₂—.

13. The liquid crystal composition described in item 12 which contains 3 to 15% by weight of the fifth component, based on the total weight of the composition.

14. A liquid crystal composition comprising at least one compound selected from the compounds represented by formula (2), at least one compound selected from the compounds represented by formula (3), at least one compound selected from the compounds represented by formula (4) and at least one compound selected from the compounds represented by formula (6):

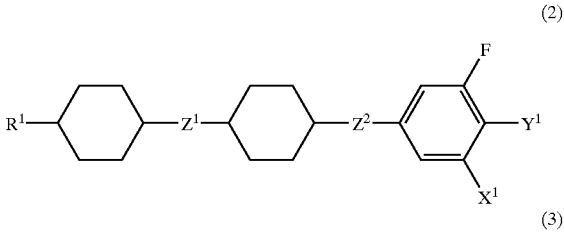

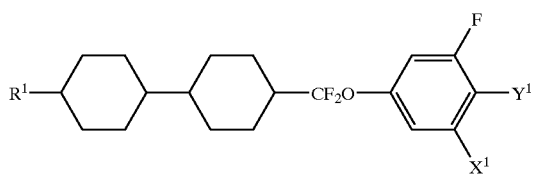

-continued

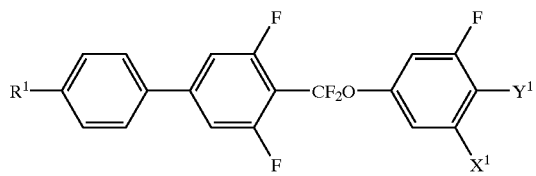

(4)

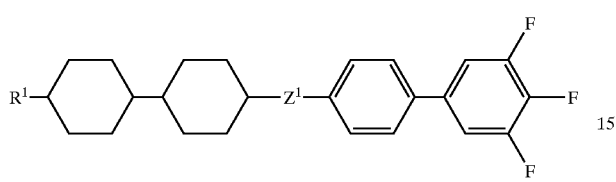

(6)

wherein, $R^1$ represents alkyl, $Z^1$ and $Z^2$ each independently represents a single bond or —$(CH_2)_2$—, $X^1$ represents hydrogen or fluorine, and $Y^1$ represents fluorine or —$OCF_3$.

15. The liquid crystal composition described in item 14 which contains 20 to 70% by weight of at least one compound selected from the compounds represented by formula (2), 10 to 40% by weight of at least one compound selected from the compounds represented by formula (3), 3 to 30% by weight of at least one compound selected from the compounds represented by formula (4) and 5 to 30% by weight of at least one compound selected from the compounds represented by formula (6), each based on the total weight of the composition.

16. The liquid crystal composition described in item 14 or 15 which further contains at least one compound selected from the compounds represented by formulas (5) and (8):

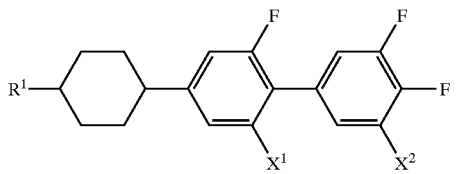

(5)

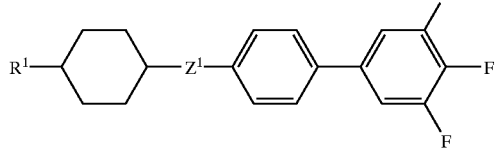

(8)

wherein, $R^1$ represents alkyl, $Z^1$ represents a single bond or —$(CH_2)_2$—, and $X^1$ and $X^2$ each independently represent hydrogen or fluorine.

17. The liquid crystal composition described in item 16 which contains 3 to 25% by weight of at least one compound selected from the compounds represented by formulas (5) and (8), based on the total weight of the composition.

18. The liquid crystal composition described in any of items 11, 13, 15 and 17 which has an optical anisotropy of 0.08 to 0.12.

19. A liquid crystal display element comprising the liquid crystal composition described in any of items 1 to 18.

20. The liquid crystal display element described in item 19, wherein the liquid crystal display element is an AM element.

21. The liquid crystal display element described in item 19, wherein the liquid crystal display element is a transmission AM element.

22. The liquid crystal composition described in item 14 which further comprises at least one compound selected from the compounds represented by formula (5).

23. The liquid crystal composition described in item 14 which further comprises at least one compound selected from the compounds represented by formula (8).

24. The liquid crystal composition described in item 14 which further comprises at least one compound selected from the compounds represented by formula (5) and at least one compound selected from the compounds represented by formula (8).

The terms used herein are explained below:

The liquid crystal composition of the present invention or the liquid crystal display element of the present invention may occasionally be abbreviated to "the composition" or "the element", respectively. A liquid crystal display element is a general term for a liquid crystal display panel and a liquid crystal display module. A main component of a liquid crystal composition is liquid crystalline compounds. The liquid crystalline compound is a general term for a compound having a liquid crystal phase such as a nematic phase, a smectic phase and the like, and a compound having no liquid crystal phase but useful for a component of the composition. At least one compound selected from the compounds represented by formula (1) may be abbreviated to "compound (1)". Compounds represented by any other formulas may also be abbreviated in the same manner.

The upper limit temperature of a nematic phase may be abbreviated to "the upper limit temperature". The lower limit of a nematic phase may be abbreviated to "the lower limit". "High in specific resistance" means that the composition has high specific resistance at the initial stage and even after a long-term use. "High in voltage holding ratio" means that the element has high voltage holding ratio at the initial stage and even after a long-term use. The characteristics such as optical anisotropy are explained using the values measured in the same manner as in Examples. The content of a component compound in the composition is expressed in terms of weight percent based on the total weight of the composition.

The composition of the present invention satisfies plurality of the characteristics, i.e., wide temperature range of a nematic phase, low viscosity, suitable optical anisotropy, low threshold voltage and high specific resistance. The composition has plurality of the above characteristics properly balanced. The element of the present invention comprises the composition. An element comprising the composition having an optical anisotropy of 0.08 to 0.12 has high contrast ratio, low electric power consumption and low voltage holding ratio, and is suitable for a transmission type AM element.

The composition of the present invention shall be explained in the following order:

First explained is the constitution of components in the composition; second, principal characteristics of the component compounds and their main effect on the composition; third, suitable mixing ratios of the compounds with any reasons therefor; fourth, suitable molecular structures of the compounds; fifth, concrete example of the compounds; and sixth, the method of synthesizing them.

The constitution of the components in the composition shall be first explained. There are 58 types of combination of the component compounds as shown in Table 2, wherein the component compounds in each of types 1 to 58 are indicated by marking a circle. In type 1, for example, compounds (1), (2), (4) and (6) are the components of the composition.

TABLE 2

Exemplified combination of compounds

| | Comp. (1) | Comp. (2) | Comp. (3) | Comp. (4) | Comp. (5) | Comp. (6) | Comp. (7) | Comp. (8) |
|---|---|---|---|---|---|---|---|---|
| Type 1 | ○ | ○ | | ○ | | ○ | | |
| Type 2 | ○ | ○ | | | ○ | ○ | | |
| Type 3 | ○ | ○ | | | ○ | ○ | | |
| Type 4 | ○ | | ○ | ○ | | ○ | | |
| Type 5 | ○ | | ○ | | ○ | ○ | | |
| Type 6 | ○ | | ○ | ○ | ○ | ○ | | |
| Type 7 | ○ | ○ | ○ | ○ | | | | |
| Type 8 | ○ | ○ | ○ | | ○ | ○ | | |
| Type 9 | ○ | ○ | ○ | ○ | ○ | ○ | | |
| Type 10 | ○ | ○ | | ○ | | | ○ | |
| Type 11 | ○ | ○ | | | ○ | | ○ | |
| Type 12 | ○ | ○ | | | ○ | ○ | ○ | |
| Type 13 | ○ | | ○ | ○ | | | ○ | |
| Type 14 | ○ | | ○ | | ○ | | ○ | |
| Type 15 | ○ | | ○ | ○ | ○ | | ○ | |
| Type 16 | ○ | ○ | ○ | ○ | | | ○ | |
| Type 17 | ○ | ○ | ○ | | ○ | | ○ | |
| Type 18 | ○ | ○ | ○ | ○ | ○ | | ○ | |
| Type 19 | ○ | ○ | | ○ | | ○ | ○ | |
| Type 20 | ○ | ○ | | | ○ | ○ | ○ | |
| Type 21 | ○ | ○ | | ○ | ○ | ○ | ○ | |
| Type 22 | ○ | | ○ | ○ | | ○ | ○ | |
| Type 23 | ○ | | ○ | | ○ | ○ | ○ | |
| Type 24 | ○ | | ○ | ○ | ○ | ○ | ○ | |
| Type 25 | ○ | ○ | ○ | ○ | | ○ | ○ | |
| Type 26 | ○ | ○ | ○ | ○ | ○ | ○ | ○ | |
| Type 27 | ○ | ○ | ○ | ○ | ○ | ○ | ○ | |
| Type 28 | ○ | ○ | | ○ | | ○ | | ○ |
| Type 29 | ○ | ○ | | | ○ | ○ | | ○ |
| Type 30 | ○ | ○ | | ○ | ○ | ○ | | ○ |
| Type 31 | ○ | | ○ | ○ | | ○ | | ○ |
| Type 32 | ○ | | ○ | | ○ | ○ | | ○ |
| Type 33 | ○ | | ○ | ○ | ○ | ○ | | ○ |
| Type 34 | ○ | ○ | ○ | ○ | | ○ | | ○ |
| Type 35 | ○ | ○ | ○ | | ○ | ○ | | ○ |
| Type 36 | ○ | ○ | ○ | ○ | ○ | ○ | | ○ |
| Type 37 | ○ | ○ | | ○ | | | ○ | ○ |
| Type 38 | ○ | ○ | | | ○ | | ○ | ○ |
| Type 39 | ○ | ○ | | ○ | ○ | | ○ | ○ |
| Type 40 | ○ | | ○ | ○ | | | ○ | ○ |
| Type 41 | ○ | | ○ | | ○ | | ○ | ○ |
| Type 42 | ○ | | ○ | ○ | ○ | | ○ | ○ |
| Type 43 | ○ | ○ | ○ | ○ | | | ○ | ○ |
| Type 44 | ○ | ○ | ○ | | ○ | | ○ | ○ |
| Type 45 | ○ | ○ | ○ | ○ | ○ | | ○ | ○ |
| Type 46 | ○ | ○ | | ○ | | ○ | ○ | ○ |
| Type 47 | ○ | ○ | | | ○ | ○ | ○ | ○ |
| Type 48 | ○ | ○ | | ○ | ○ | ○ | ○ | ○ |
| Type 49 | ○ | | ○ | ○ | | ○ | ○ | ○ |
| Type 50 | ○ | | ○ | | ○ | ○ | ○ | ○ |
| Type 51 | ○ | | ○ | ○ | ○ | ○ | ○ | ○ |
| Type 52 | ○ | ○ | ○ | ○ | | ○ | ○ | ○ |
| Type 53 | ○ | ○ | ○ | | ○ | ○ | ○ | ○ |
| Type 54 | ○ | ○ | ○ | ○ | ○ | ○ | ○ | ○ |
| Type 55 | | ○ | ○ | ○ | ○ | ○ | | |
| Type 56 | | ○ | ○ | ○ | ○ | ○ | | |
| Type 57 | | ○ | ○ | ○ | | ○ | ○ | |
| Type 58 | | ○ | ○ | ○ | ○ | | | ○ |

The composition of the present invention is classified into composition A and composition B. Composition A may further contain other compounds. The "other compounds" include a liquid crystalline compound, additives and the like. The liquid crystalline compound is different from compounds (1) to (8) and is mixed with the composition for the purpose of adjusting the characteristics of the composition. The additives include an optically active compound, a coloring matter and the like. An optically active compound is mixed with the composition for the purpose of giving a twist angle by inducing a spiral structure. A coloring matter is mixed with the composition to conform to the element of a guest host (GH) mode.

Composition B essentially consists of the compounds selected from compounds (1) to (8). The term "essentially" here means that the composition does not contain any liquid crystalline compound other than these compounds. The term "essentially" also means that the composition may further contain impurities, an optically active compound and a coloring material. Composition B comprises less components than composition A and is preferable to compound A from the viewpoint of cost. On the other hand, composition A is preferable to composition B in that the physical properties of composition A can be further adjusted by mixing with other liquid crystalline compounds.

Secondly explained are principal characteristics of the component compounds and their effects on the composition. Principal characteristics of the compounds are summarized in Table 3, wherein L means large or high, M means middle degree and S means small or low. Symbols L, M and S are based on the relative evaluation of these compounds.

TABLE 3

Characteristics of the compounds

|  | (1) | (2) | (3) | (4) | (5) | (6) | (7) | (8) |
|---|---|---|---|---|---|---|---|---|
| Upper limit temperature | S | M | M | M | M | L | L | M |
| Viscosity | S | S | M | M | S | L | L | M |
| Optical anisotropy | S | M | M | L | L | L | L | L |
| Dielectric anisotropy | L | M | L | L | M | M | M | M |
| Specific resistance | L | L | L | L | L | L | L | L |

A compound having a high upper limit temperature elevates the upper limit temperature of the composition. A compound having a low viscosity reduces the viscosity of the composition. A compound having small optical anisotropy lowers the optical anisotropy of the compound. A compound having large optical anisotropy elevates the optical anisotropy of the compound. A compound having a large dielectric anisotropy reduces the threshold voltage of the composition. A compound having high specific resistance elevates the specific resistance of the composition and also the voltage holding ratio of the element.

Third explained are suitable mixing ratios of the component compounds of the composition and the reasons therefor:

In case of the composition comprising compound (1) as an essential component, mixing ratios of the components are as follows.

The content of the first component is preferably 3% or more for reducing the viscosity of the composition and is preferably 20% or less for elevating the upper limit temperature. More preferably, it is 5 to 15%. The content of the second component is preferably 40% or more for elevating the upper limit temperature and is preferably 80% or less for reducing the lower limit temperature. More preferably, it is 55 to 70%. The content of the third component is preferably 3% or more for reducing the threshold voltage and is preferably 30% or less for reducing the lower limit temperature. More preferably, it is 5 to 20%. The content of the fourth component is preferably 5% or more for elevating the upper limit temperature and is preferably 30% or less for reducing the lower limit temperature. More preferably, it is 10 to 20%. The content of the fifth component, if added, is preferably 3% or more for reducing the lower limit temperature and is preferably 15% or less for reducing the optical anisotropy. More preferably, it is 3 to 10%.

In case of the composition not comprising compound (1) as an essential component, desirable mixing ratios of the components are as follows.

The content of compound (2) is preferably 20% or more for elevating the upper limit temperature of the composition and is preferably 70% or less for reducing the lower limit temperature. More preferably, it is 35 to 55%. The content of compound (3) is preferably 10% or more for reducing the threshold voltage and is preferably 40% or less for reducing the lower limit temperature. More preferably, it is 15 to 30%. The content of compound (4) is preferably 3% or more for reducing the threshold voltage and is preferably 30% or less for reducing the lower limit temperature or for reducing the optical anisotropy. More preferably, it is 5 to 20%. The content of compound (6) is preferably 5% or more for elevating the upper limit temperature and is 30% or less for reducing the lower limit temperature. More preferably, it is 10 to 20%. The content of one or both of compound (5) and compound (8) is preferably 3% or more for lowering the viscosity and 25% or less for reducing the optical anisotropy. More preferably, it is 3 to 15%.

Fourth, desirable molecular structures of the compounds as a component are explained below:

The symbol $R^1$ is used in several formulas of the compounds. $R^1$ may be identical or different in these formulas. For example, in one case, $R^1$ is ethyl in both compounds (1) and (2). In another case, $R^1$ of compound (1) is ethyl and $R^1$ of compound (2) is propyl. This rule is also applicable to the symbols $Z^1$, $Z^2$, $X^1$, $X^2$ and $Y^1$.

$R^1$ is preferably alkyl of 1 to 10 carbons. Methyl, ethyl, propyl, butyl, pentyl, hexyl, heptyl or octyl is preferred. More preferred is ethyl, propyl, butyl, pentyl or heptyl.

1,4-Cyclohexylene of the component compound is preferably in trans configuration rather than cis configuration.

Fifth, concrete examples of the compounds as a component are given. The desirable compounds (1) to (8) are shown below as compounds (1-1) to (8-2), wherein $R^1$ represents alkyl. The symbol $R^1$ was used in several of the desirable compounds. In any two compounds, a group represented by $R^1$ may be identical or different as already stated. Desirable alkyl groups are as described above.

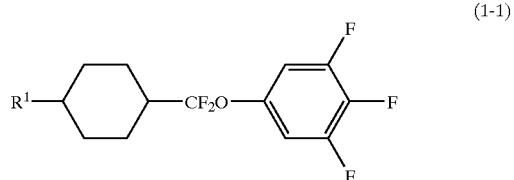

(1-1)

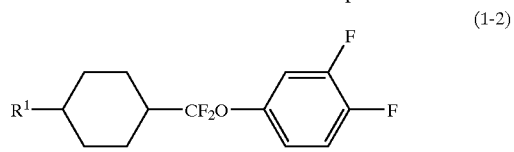

(1-2)

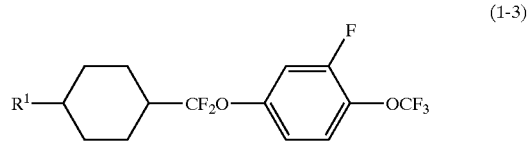

(1-3)

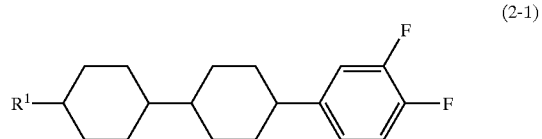

(2-1)

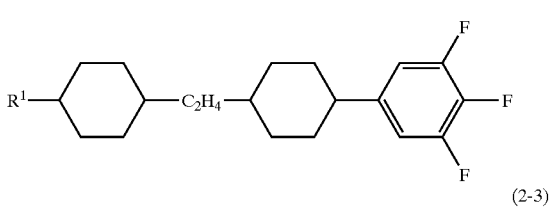

(2-2)

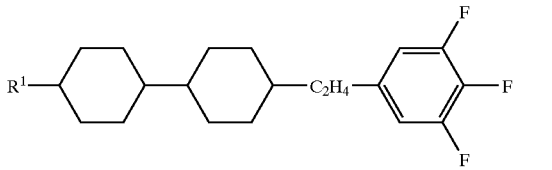

(2-3)

-continued

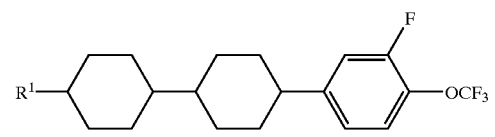
(2-4)

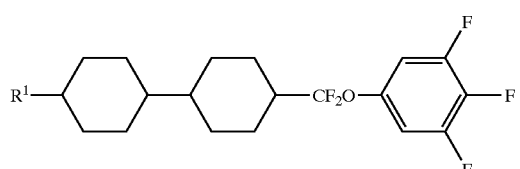
(3-1)

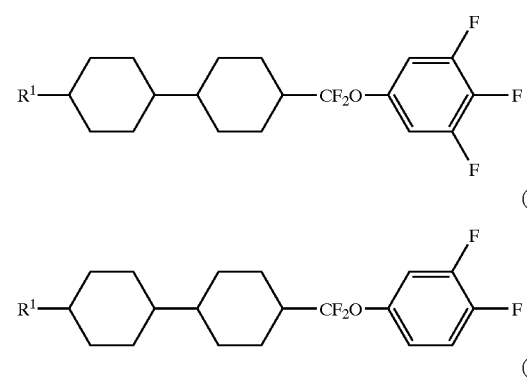
(3-2)

(3-3)

(4-1)

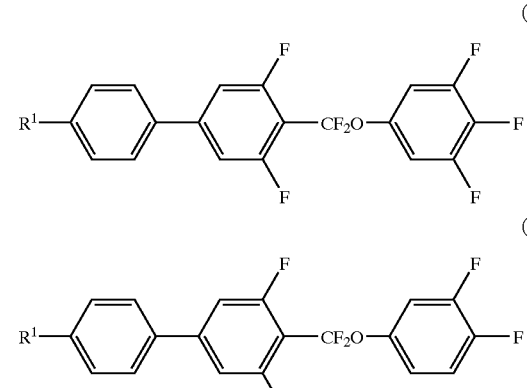
(4-2)

(4-3)

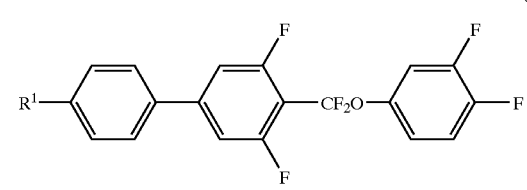
(5-1)

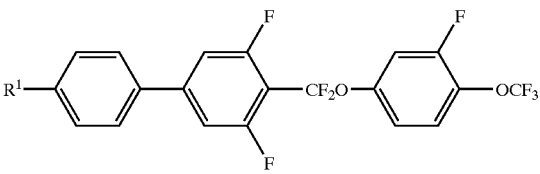
(5-2)

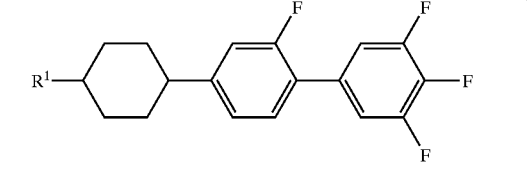

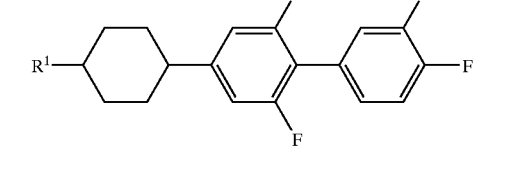

-continued

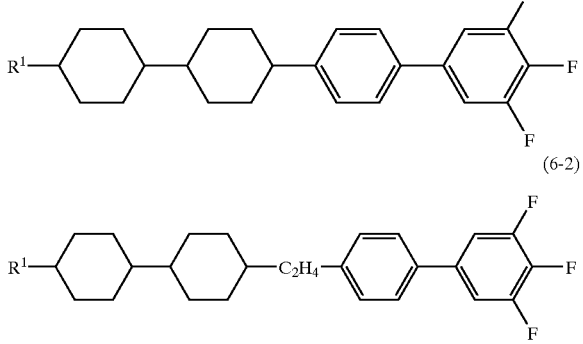
(6-1)

(6-2)

(7-1)

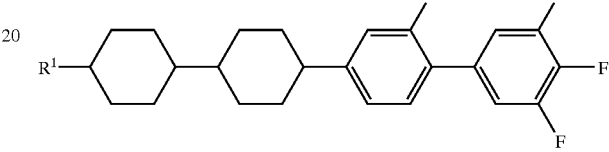
(8-1)

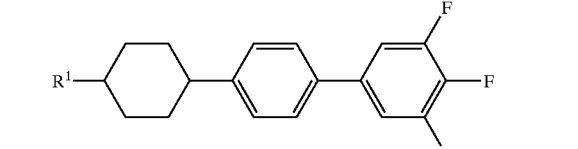
(8-2)

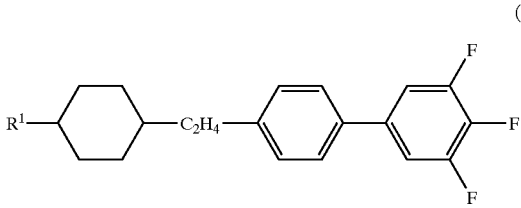

Sixth, the preparation of the compounds as a component is explained. These compounds are prepared by known methods. Compounds (1-1) and (3-1) are prepared by modifying the method disclosed in JP-A 10-204016/1998. Compounds (2-1), (6-1) and (8-1) are prepared according to the method described in JP-A 2-233626/1990. Compound (4-1) is prepared according to the method described in JP-A 10-251186/1998. Compound (5-1) is prepared according to the method described in JP-A 2-233626/1990. Compound (7-1) is prepared according to the method described in JP-A 9-53072/1997.

The compounds for which preparation methods are not specified above can be prepared according to the methods described in Organic Syntheses (John Wiley & Sons, Inc.), Organic Reactions (John Wiley & Sons, Inc.), Comprehensive Organic Synthesis (Pergamon Press), New Experimental Chemistry Course (Shin Jikken Kagaku Kouza) (Maruzen, Inc.) and the like. The composition is prepared according to known methods from the compounds thus obtained. For example, the compounds are mixed and heated to dissolve each other to prepare a composition.

The optical anisotropy of the present composition mainly ranges from 0.08 to 0.12. An element comprising the composition has high voltage holding ratio. Accordingly, the composition is suitable for an AM element, especially for a transmission type AM element. By controlling the mixing ratio of the component compounds or by further mixing any crystalline compounds other than the component compounds, the composition having an optical anisotropy of 0.07 to 0.18 or 0.06 to 0.20 may be prepared.

The composition of the invention can be used not only for an AM element but also for a PM element. It can be used for the elements of the modes such as PC, TN, STN, ECB, OCB, IPS and VA. These elements may be a reflection type, a transmission type or a semi-transmission type. The composition is usable for such elements as nematic curvilinear aligned phase (NCAP) made by microcapsulating the composition and polymer dispersed (PD) element obtained by forming a three dimensional net-work polymer in the composition, e.g., polymer network (PN) element.

EXAMPLE

The present invention shall be explained in detail by way of Examples, which do not limit the present invention. Compounds described in Comparative Examples and Examples are expressed by the symbols according to the definition set forth in Table 4. In Table 4, the steric configuration of 1,4-cyclohexylene and 1,3-dioxane-2,5-diyl is a trans-form. The bonding group of —CH=CH— is a trans-form. The parenthesized number next to the symbolized compounds in the Examples corresponds to the number of the desirable compound. The symbol (-) next to the symbolized compounds in Examples 5 and 9 denotes the other compound than the numbered compounds. The ratio of compounds (percentage) is expressed in terms of weight percent (% by weight) based on the total weight of the composition. The characteristics of the composition are given last.

TABLE 4

Notation of compounds using symbols

R—(A₁)—Z₁—••••••••••—Zₙ—(Aₙ)—X

| 1) Left terminal group R— | Symbol | 3) Bonding group —Zₙ— | Symbol |
|---|---|---|---|
| $C_nH_{2n+1}$— | n— | —$C_2H_4$— | 2 |
| $C_nH_{2n+1}OC_mH_{2m}$— | nOm— | —COO— | E |
| | | —CH=CH— | V |
| | | —$CH_2O$— | 10 |
| | | —$CF_2O$— | X |

| 2) Ring structure —(Aₙ)— | Symbol | 4) Right terminal group —X | Symbol |
|---|---|---|---|
| 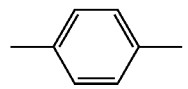 | B | —F | —F |
| 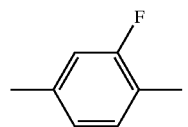 | B(F) | —Cl | —CL |
| 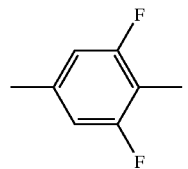 | B(F,F) | —$CF_3$ | —CF3 |

TABLE 4-continued

Notation of compounds using symbols

R—(A₁)—Z₁—••••••••••—Zₙ—(Aₙ)—X

| | | | |
|---|---|---|---|
|  | H | —$OCF_3$ | —OCF3 |
| 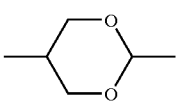 | G | —$OCF_2H$ | —OCF2H |
| | | —$C_nH_{2n+1}$ | —n |
| | | —$OC_nH_{2n+1}$ | —On |

5) Examples of Description

Example 1 5-HXB(F,F)—F

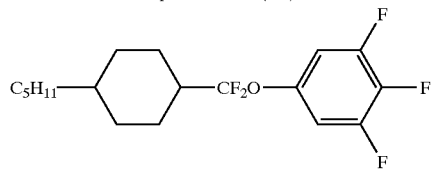

Example 2 3-HHB(F,F)—F

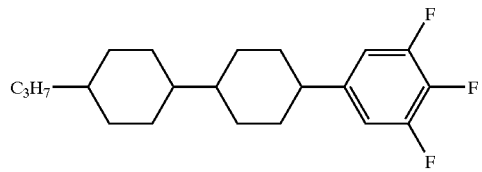

Example 3 3-BB(F,F)XB(F,F)—F

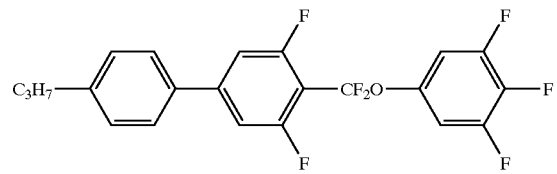

The characteristic values were measured according to the following methods:

Upper limit temperature of a nematic phase (NI; ° C.): A sample was put on a hot plate in a melting point measuring apparatus equipped with a polarizing microscope and heated at the rate of 1° C. per minute. The temperature at which a part of the sample began to change from a nematic phase into an isotropic liquid was measured. The upper limit temperature of a nematic phase may occasionally be abbreviated to "upper limit temperature".

Lower limit temperature (Tc; ° C.) of a nematic phase: A sample having a nematic phase was kept in a freezer at temperatures of 0° C., –10° C., –20° C., –30° C. and –40° C. for ten days, respectively, to observe liquid crystal phase. For example, when the sample remains in a nematic phase at –20° C. and changes to a crystal or smectic phase at –30° C., Tc is then expressed as <–20° C. The lower limit temperature may occasionally be abbreviated to "lower limit temperature".

Optical anisotropy (Δn; measured at 25° C.): Optical anisotropy was measured by means of Abbe refractometer with a light having the wavelength of 589 nm.

Viscosity (η; mPa·s, measured at temperatures of 20° C. and −10° C.): Viscosity was measured by means of E-type viscometer. The value measured at 20° C. or −10° C. was notated as η(20° C.) or η(−10° C.), respectively.

Dielectric anisotropy (Δε; measured at 25° C.): A sample was put into a liquid crystal cell with a cell gap between two sheets of glass substrates of 9 μm and a twist angle of 80 degrees. A dielectric constant of a liquid crystal molecule in the parallel (longitudinal) direction (ε∥) was measured by applying an electric pressure of 10 volts to the cell. A dielectric constant of a liquid crystal molecule in the perpendicular direction (ε⊥) was measured by applying an electric pressure of 0.5 volt to the cell. The dielectric anisotropy was calculated by an equation of Δε=ε∥−ε⊥. A dielectric constant of a composition having a positive dielectric constant was measured by this method. When a compound is used as a sample, it was mixed with a suitable liquid crystal composition to measure the dielectric constant of composition.

Threshold voltage (Vth; measured at 25° C.; V): A sample was put into a TN element driven with a normally white mode and having two sheets of glass substrates whose interval (cell gap) was (0.5/Δn) μm and whose twist angle was 80 degree. Δn is a value of the optical anisotropy measured by the above method. A rectangular wave having a frequency of 32 Hz was applied to this element. The applied voltage was increased, and when a transmittance of light passing through the element reached 90%, the voltage was measured.

Voltage holding ratio (VHR; %): Voltage holding ratio was measured according to the method described in EIAJ·ED-2521A of Standard of Electric Industries Association of Japan for measuring the voltage holding ratio of an element having a liquid crystal composition and an aligning film. A TN element used for measurement has a polyimide aligning film and has a cell gap of 6 μm. A wave form of a voltage applied to a TN element at 25° C. was observed by means of a cathode ray oscilloscope to determine an area between a voltage curve and the horizontal line in a unit frequency. After removing the TN element, a wave form of the voltage was observed in the same manner to measure an area. Voltage holding ratio was calculated by comparison of the two areas. The value obtained was expressed as VHR-1. Then, this TN element was heated at 100° C. for 250 hours. After cooling to 25° C., the TN element was measured for the voltage holding ratio in a similar manner. The value obtained after heating was expressed as VHR-2. This heating test was carried out as a substitution of a test for a long-term use.

Comparative Example 1

| | | |
|---|---|---|
| 5-HXB (F)—F | 2% | |
| 5-HXB (F)—OCF3 | 2% | |
| 5-HXB (F)—CF3 | 2% | |
| 5-HXB (F)—OCF2H | 2% | |
| 3-HB—CL | 10% | |
| 101-HH-5 | 5% | |
| 2-HBB (F)—F | 8% | |
| 3-HBB (F)—F | 8% | |
| 5-HBB (F)—F | 14% | |
| 4-HHB—CL | 8% | |
| 5-HHB—CL | 8% | |
| 3-H2HB (F)—CL | 4% | |
| 3-HBB (F, F)—F | 10% | |
| 5-H2BB (F, F)—F | 9% | |

-continued

| | |
|---|---|
| 3-HB (F) VB-2 | 4% |
| 3-HB (F) VB-3 | 4% |

NI = 88.0° C.;
T$_c$ < −10° C.;
Δn = 0.124;
η (20° C.) = 22.9 mPa · s;
η (−10° C.) = 321 mPa · s;
Vth = 2.15 V;
VHR-1 = 98.7%;
VHR-2 = 90.1%.

The composition of Use Example 13 disclosed in JP-A 204016/1998 is chosen here, because it contains compound (1) of the present invention and its characteristics are described in the gazette. The following are the components and characteristics of the composition: This composition is high in lower limit temperature, high in threshold voltage and small in VHR-2.

Comparative Example 2

| | |
|---|---|
| 5-HXB (F)—F | 2% |
| 5-HXB (F)—OCF3 | 2% |
| 2-HHXB (F, F)—F | 5% |
| 3-HHXB (F, F)—F | 5% |
| 4-HHXB (F, F)—F | 5% |
| 5-HHXB (F, F)—F | 5% |
| 7-HB (F, F)—F | 8% |
| 3-H2HB (F, F)—F | 7% |
| 3-HHB (F, F)—F | 10% |
| 4-HHB (F, F)—F | 5% |
| 2-HHBB (F, F)—F | 4% |
| 3-HHBB (F, F)—F | 4% |
| 3-HHBXB (F, F)—F | 2% |
| 3-HHBXB (F)—OCF3 | 2% |
| 3-HBXB (F)—OCF3 | 11% |
| 4-HBXB (F)—OCF3 | 11% |
| 5-HBXB (F)—OCF3 | 12% |

NI = 70.4° C.;
T$_c$ < −20° C.;
Δn = 0.082;
η (20° C.) = 23.8 mPa · s;
η (−10° C.) = 335 mPa · s;
Vth = 1.48 V;
VHR-1 = 98.9%;
VHR-2 = 93.8%.

The composition of Example 5 disclosed in JP-A 204436/1998 is chosen here, because it contains compound (3) of the present invention and has a low viscosity. The following are the components and characteristics of the composition: This composition is low in upper limit temperature, high in lower limit temperature and high in threshold voltage.

Comparative Example 3

| | |
|---|---|
| 2-HHXB (F, F)—F | 4% |
| 3-HHXB (F, F)—F | 4% |
| 4-HHXB (F, F)—F | 4% |
| 5-HHXB (F, F)—F | 4% |
| 7-HB (F, F)—F | 12% |
| 3-HBB (F, F)—F | 29% |
| 2-HBEB (F, F)—F | 3% |
| 3-HBEB (F, F)—F | 5% |
| 5-HBEB (F, F)—F | 3% |
| 3-HHEB (F, F)—F | 10% |
| 4-HHEB (F, F)—F | 3% |

-continued

| | |
|---|---|
| 5-HHEB (F, F)—F | 5% |
| 2-HHBB (F, F)—F | 4% |
| 3-HB (F, F) XB (F)—F | 2% |
| 3-HB (F, F) XB (F)—OCF3 | 2% |
| 3-HHB (F) XB (F, F)—F | 2% |
| 3-HHB (F, F) XB (F)—OCF3 | 2% |
| 3-HHB (F, F) XB (F)—F | 2% |

NI = 70.0° C.;
$T_c < -30°$ C.;
$\Delta n = 0.094$;
$\eta$ (20° C.) = 34.0 mPa · s;
$\eta$ (−10° C.) = 378 mPa · s;
Vth = 1.20 V;
VHR-1 = 98.7%;
VHR-2 = 84.5%.

The composition of Example 6 disclosed in JP-A 204436/1998 is chosen here, because it contains compound (3) of the present invention and has low threshold voltage. The following are the components and characteristics of the composition: This composition is low in upper limit temperature, high in viscosity at 20° C. and −10° C. and small in VHR-2.

Comparative Example 4

| | |
|---|---|
| 3-BB (F, F) XB (F, F)—F | 3% |
| 5-HB (F, F) XB (F, F)—F | 3% |
| 3-HBB (F, F)—F | 20% |
| 5-HBB (F, F)—F | 15% |
| 3-HHBB (F, F)—F | 6% |
| 3-HHB (F, F)—F | 8% |
| 3-HHEB (F, F)—F | 10% |
| 2-HBEB (F, F)—F | 3% |
| 3-HBEB (F, F)—F | 5% |
| 5-HBEB (F, F)—F | 3% |
| 5-HB—CL | 11% |
| 3-HH-4 | 8% |
| 3-HHB-1 | 5% |

NI = 74.2° C.;
$T_c < -30°$ C.;
$\Delta n = 0.104$;
$\eta$ (20° C.) = 22.0 mPa · s;
$\eta$ (−10° C.) = 318 mPa · s;
Vth = 1.38 V;
VHR-1 = 98.2%;
VHR-2 = 85.1%.

The composition of Example 19 disclosed in JP-A 3051/2001 is chosen here, because it contains compound (4) of the present invention and has an optical anisotropy of 0.12 or less and a low viscosity. The following are the components and characteristics of the composition: This composition is low in upper limit temperature, high in threshold voltage and small in VHR-2.

Comparative Example 5

| | |
|---|---|
| 3-BB (F, F) XB (F, F)—F | 4% |
| 3-HB (F, F) XB (F, F)—F | 4% |
| 3-HBB (F, F)—F | 21% |
| 3-HHBB (F, F)—F | 4% |
| 2-HHB (F)—F | 7% |
| 3-HHB (F)—F | 7% |
| 3-HHB (F, F)—F | 8% |
| 3-H2HB (F, F)—F | 10% |
| 3-HHEB (F, F)—F | 10% |
| 4-HHEB (F, F)—F | 3% |
| 2-HBEB (F, F)—F | 2% |
| 3-HBEB (F, F)—F | 3% |
| 3-HGB (F, F)—F | 3% |
| 4-GHB (F, F)—F | 7% |
| 5-GHB (F, F)—F | 7% |

NI = 70.3° C.;
$T_c < -30°$ C.;
$\Delta n = 0.091$;
$\eta$ (20° C.) = 38.1 mPa · s;
$\eta$ (−10° C.) = 423 mPa · s;
Vth = 0.82 V;
VHR-1 = 98.0%;
VHR-2 = 84.5%.

The composition of Example 21 disclosed in JP-A 3051/2001 is chosen here, because it contains compound (4) of the present invention and has an optical anisotropy of 0.12 or less and low threshold voltage. The following are the components and characteristics of the composition: This composition is low in upper Limit temperature, high in viscosity at 20° C. and −10° C. and small in VHR-2.

Comparative Example 6

| | |
|---|---|
| 2-BB (F, F) XB (F, F)—F | 10% |
| 3-BB (F, F) XB (F, F)—F | 10% |
| 2-HBB (F, F) XB (F, F)—F | 11% |
| 3-HBB (F, F) XB (F, F)—F | 12% |
| 3-H2HB (F, F)—F | 12% |
| 4-H2HB (F, F)—F | 10% |
| 5-H2HB (F, F)—F | 10% |
| 3-HHB (F, F)—F | 8% |
| 4-HHB (F, F)—F | 5% |
| 3-HH2B (F, F)—F | 6% |
| 3-HBB (F, F)—F | 6% |

NI = 73.5° C.;
$T_c < -30°$ C.;
$\Delta n = 0.105$;
$\eta$ (20° C.) = 34.0 mPa · s;
$\eta$ (−10° C.) = 378 mPa · s;
Vth = 1.01 V;
VHR-1 = 98.7%;
VHR-2 = 93.9%.

The composition of Example 2 disclosed in JP-A 3053/2001 is chosen here, because it contains compound (4) of the present invention and has an optical anisotropy of 0.12 or less and low threshold voltage. The following are the components and characteristics of the composition: This composition is low in upper limit temperature and high in viscosity at 20° C. and −10° C.

Comparative Example 7

| | |
|---|---|
| 2-BB (F, F) XB (F, F)—F | 9% |
| 3-BB (F, F) XB (F, F)—F | 9% |
| 7-HB (F, F)—F | 6% |
| 3-H2HB (F, F)—F | 9% |
| 4-H2HB (F, F)—F | 9% |
| 5-H2HB (F, F)—F | 9% |
| 3-HHB (F, F)—F | 7% |
| 4-HHB (F, F)—F | 5% |
| 3-HH2B (F, F)—F | 4% |
| 3-HHBB (F, F)—F | 3% |
| 3-HB—O2 | 3% |
| 3-HH-4 | 10% |

-continued

| | | |
|---|---|---|
| 3-HH-5 | 5% | |
| 3-HHB-1 | 2% | |
| 4-HHB—CL | 4% | |
| 2-HHHB (F, F)—F | 2% | |
| 3-HHHB (F, F)—F | 2% | |
| 4-HHBB (F, F)—F | 2% | |

NI = 72.9° C.;
$T_c$ < -20° C.;
Δn = 0.082;
η (20° C.) = 20.8 mPa · s;
η (-10° C.) = 309 mPa · s;
Vth = 1.23 V;
VHR-1 = 98.7%;
VHR-2 = 94.0%.

The composition of Example 6 disclosed in JP-A 3053/2001 is chosen here, because it contains compound (4) of the present invention and has an optical anisotropy of 0.12 or less and a low viscosity. The following are the components and characteristics of the composition: This composition is low in upper limit temperature and high in lower limit temperature.

Comparative Example 8

| | | |
|---|---|---|
| 3-BBB (F, F) XB—F | 5% | |
| 3-HHB (F, F)—F | 10% | |
| 3-H2HB (F, F)—F | 9% | |
| 3-HBB (F, F)—F | 7% | |
| 5-HBB (F, F)—F | 8% | |
| 3-HHBB (F, F)—F | 6% | |
| 3-HH2BB (F, F)—F | 4% | |
| 3-BB (F, F) XB (F, F)—F | 20% | |
| 5-BB (F, F) XB (F, F)—F | 15% | |
| 3-HH-4 | 3% | |
| 3-HHB-1 | 6% | |
| 101-HBBH-3 | 7% | |

NI = 84.6° C.;
$T_c$ < -30° C.;
Δn = 0.124;
η (20° C.) = 32.2 mPa · s;
η (-10° C.) = 358 mPa · s;
Vth = 1.30 V;
VHR-1 = 98.8%;
VHR-2 = 93.7%.

The composition of Example 5 disclosed in JP-A 123170/2001 is chosen here, because it contains compound (4) of the present invention and has small optical anisotropy. The following are the components and characteristics of the composition: This composition is high in threshold voltage and high in viscosity at 20° C. and -20° C.

Comparative Example 9

| | | |
|---|---|---|
| 3-HEH-3 | 3% | |
| 3-HHEH-3 | 3% | |
| 7-HB (F)—F | 5% | |
| 7-HB (F, F)—F | 5% | |
| 5-HB—CL | 5% | |
| 3-HHB—F | 5% | |
| 3-HHB (F, F)—F | 5% | |
| 5-HHB (F, F)—F | 5% | |
| 3-H2HB (F, F)—F | 5% | |
| 3-HHB (F)—OCF3 | 5% | |
| 3-HHB (F, F)—OCF3 | 10% | |
| 3-HHXB (F, F)—F | 12% | |

-continued

| | | |
|---|---|---|
| 5-HHXB (F, F)—F | 12% | |
| 3-HH-4 | 4% | |
| 3-HB—O2 | 5% | |
| 3-HHB-1 | 4% | |
| 3-HHB—O1 | 4% | |
| 4-HBBH-4 | 3% | |

NI = 86.7° C.;
$T_c$ < -20° C.;
Δn = 0.071;
η (20° C.) = 21.4 mPa · s;
η (-10° C.) = 305 mPa · s;
Vth = 1.46 V;
VHR-1 = 99.1%;
VHR-2 = 93.5%.

The composition of Example 3 disclosed in JP-A 288470/2001 is chosen here, because it contains compound (3) of the present invention and has large optical anisotropy. The following are the components and characteristics of the composition: This composition is small in optical anisotropy, high in lower limit temperature and high in threshold voltage.

Example 1

| | | |
|---|---|---|
| 5-H x B (F, F)—F | (1-1) | 2% |
| 5-H x B (F)—F | (1-2) | 2% |
| 5-H x B (F)—OCF3 | (1-3) | 1% |
| 2-HHB (F, F)—F | (2-1) | 8% |
| 3-HHB (F, F)—F | (2-1) | 10% |
| 4-HHB (F, F)—F | (2-1) | 3% |
| 3-H2HB (F, F)—F | (2-2) | 6% |
| 5-H2HB (F, F)—F | (2-2) | 8% |
| 2-HHB (F)—OCF3 | (2-4) | 3% |
| 3-HHB (F)—OCF3 | (2-4) | 3% |
| 2-HH x B (F, F)—F | (3-1) | 7% |
| 3-HH x B (F, F)—F | (3-1) | 10% |
| 5-HH x B (F, F)—F | (3-1) | 4% |
| 3-HH x B (F)—F | (3-2) | 2% |
| 3-HH x B (F)—OCF3 | (3-3) | 2% |
| 3-BB (F, F) x B (F, F)—F | (4-1) | 10% |
| 3-BB (F, F) x B (F)—F | (4-2) | 2% |
| 3-BB (F, F) x B (F)—OCF3 | (4-3) | 2% |
| 2-HHBB (F, F)—F | (6-1) | 3% |
| 3-HHBB (F, F)—F | (6-1) | 3% |
| 4-HHBB (F, F)—F | (6-1) | 3% |
| 3-HH2BB (F, F)—F | (6-2) | 3% |
| 4-HH2BB (F, F)—F | (6-2) | 3% |

NI = 80.1° C.;
$T_c$ < -30° C.;
Δn = 0.087;
η (20° C.) = 30.1 mPa · s;
η (-10° C.) = 305 mPa · s;
Vth = 1.19 V;
VHR-1 = 98.6%;
VHR-2 = 93.4%.

Example 2

| | | |
|---|---|---|
| 5-H x B (F, F)—F | (1-1) | 5% |
| 2-HHB (F, F)—F | (2-1) | 8% |
| 3-HHB (F, F)—F | (2-1) | 10% |
| 4-HHB (F, F)—F | (2-1) | 3% |
| 3-H2HB (F, F)—F | (2-2) | 6% |
| 5-H2HB (F, F)—F | (2-2) | 8% |
| 3-HH2B (F, F)—F | (2-3) | 2% |
| 2-HHB (F)—OCF3 | (2-4) | 3% |
| 2-HH x B (F, F)—F | (3-1) | 6% |

-continued

| | | |
|---|---|---|
| 3-HH x B (F, F)—F | (3-1) | 9% |
| 5-HH x B (F, F)—F | (3-1) | 6% |
| 3-HH x B (F)—F | (3-2) | 2% |
| 3-HH x B (F)—OCF3 | (3-3) | 2% |
| 3-BB (F, F) x B (F, F)—F | (4-1) | 12% |
| 3-HB (F) B (F, F)—F | (5-1) | 3% |
| 2-HHBB (F, F)—F | (6-1) | 3% |
| 3-HHBB (F, F)—F | (6-1) | 3% |
| 4-HHBB (F, F)—F | (6-1) | 3% |
| 3-HH2BB (F, F)—F | (6-2) | 3% |
| 3-HHB (F) B (F, F)—F | (7-1) | 3% |

NI = 80.2° C.;
$T_c$ < −30° C.;
$\Delta n$ = 0.080;
$\eta$ (20° C.) = 30.4 mPa · s;
$\eta$ (−10° C.) = 307 mPa · s;
Vth = 1.16 V;
VHR-1 = 98.7%;
VHR-2 = 93.3%.

Example 3

| | | |
|---|---|---|
| 5-H x B (F, F)—F | (1-1) | 8% |
| 5-H x B (F)—F | (1-2) | 2% |
| 2-HHB (F, F)—F | (2-1) | 8% |
| 3-HHB (F, F)—F | (2-1) | 10% |
| 3-H2HB (F, F)—F | (2-2) | 5% |
| 5-H2HB (F, F)—F | (2-2) | 9% |
| 2-HHB (F)—OCF3 | (2-4) | 5% |
| 3-HHB (F)—OCF3 | (2-4) | 5% |
| 2-HH x B (F, F)—F | (3-1) | 7% |
| 3-HH x B (F, F)—F | (3-1) | 10% |
| 5-HH x B (F, F)—F | (3-1) | 5% |
| 3-HH x B (F)—F | (3-2) | 2% |
| 3-HH x B (F)—OCF3 | (3-3) | 2% |
| 3-BB (F, F) x B (F, F)—F | (4-1) | 4% |
| 3-HB (F, F) B (F)—F | (5-2) | 3% |
| 2-HHBB (F, F)—F | (6-1) | 3% |
| 3-HHBB (F, F)—F | (6-1) | 3% |
| 4-HHBB (F, F)—F | (6-1) | 3% |
| 2-HHB (F) B (F, F)—F | (7-1) | 3% |
| 3-HHB (F) B (F, F)—F | (7-1) | 3% |

NI = 80.2° C.;
$T_c$ < −30° C.;
$\Delta n$ = 0.080;
$\eta$ (20° C.) = 29.9 mPa · s;
$\eta$ (−10° C.) = 298 mPa · s;
Vth = 1.14 V;
VHR-1 = 98.9%;
VHR-2 = 92.8%.

Example 4

| | | |
|---|---|---|
| 5-H x B (F, F)—F | (1-1) | 3% |
| 5-H x B (F)—F | (1-2) | 2% |
| 2-HHB (F, F)—F | (2-1) | 6% |
| 3-HHB (F, F)—F | (2-1) | 10% |
| 3-H2HB (F, F)—F | (2-2) | 7% |
| 5-H2HB (F, F)—F | (2-2) | 8% |
| 2-HHB (F)—OCF3 | (2-4) | 5% |
| 3-HHB (F)—OCF3 | (2-4) | 5% |
| 2-HH x B (F, F)—F | (3-1) | 5% |
| 3-HH x B (F, F)—F | (3-1) | 10% |
| 5-HH x B (F, F)—F | (3-1) | 4% |
| 3-HH x B (F)—F | (3-2) | 2% |
| 3-BB (F, F) x B (F, F)—F | (4-1) | 10% |
| 3-BB (F, F) x B (F)—F | (4-2) | 2% |
| 3-BB (F, F) x B (F)—OCF3 | (4-3) | 2% |
| 2-HHBB (F, F)—F | (6-1) | 3% |

-continued

| | | |
|---|---|---|
| 3-HHBB (F, F)—F | (6-1) | 3% |
| 4-HHBB (F, F)—F | (6-1) | 3% |
| 3-HH2BB (F, F)—F | (6-2) | 3% |
| 4-HH2BB (F, F)—F | (6-2) | 3% |
| 3-HBB (F, F)—F | (8-1) | 2% |
| 3-H2BB (F, F)—F | (8-2) | 2% |

NI = 80.4° C.;
$T_c$ < −30° C.;
$\Delta n$ = 0.089;
$\eta$ (20° C.) = 29.2 mPa · s;
$\eta$ (−10° C.) = 293 mPa · s;
Vth = 1.20 V;
VHR-1 = 98.8%;
VHR-2 = 93.3%.

Example 5

| | | |
|---|---|---|
| 5-H x B (F, F)—F | (1-1) | 6% |
| 2-HHB (F, F)—F | (2-1) | 8% |
| 3-HHB (F, F)—F | (2-1) | 10% |
| 3-H2HB (F, F)—F | (2-2) | 8% |
| 5-H2HB (F, F)—F | (2-2) | 9% |
| 2-HHB (F)—OCF3 | (2-4) | 5% |
| 3-HHB (F)—OCF3 | (2-4) | 5% |
| 2-HH x B (F, F)—F | (3-1) | 5% |
| 3-HH x B (F, F)—F | (3-1) | 10% |
| 3-HH x B (F)—F | (3-2) | 4% |
| 3-BB (F, F) x B (F, F)—F | (4-1) | 10% |
| 2-HHBB (F, F)—F | (6-1) | 3% |
| 3-HHBB (F, F)—F | (6-1) | 3% |
| 4-HHBB (F, F)—F | (6-1) | 3% |
| 3-HH2BB (F, F)—F | (6-2) | 3% |
| 4-HH2BB (F, F)—F | (6-2) | 3% |
| 3-HBB (F, F)—F | (8-1) | 3% |
| 101-HH2B (F, F)—F | (-) | 2% |

NI = 80.4° C.;
$T_c$ < −30° C.;
$\Delta n$ = 0.087;
$\eta$ (20° C.) = 29.5 mPa · s;
$\eta$ (−10° C.) = 298 mPa · s;
Vth = 1.25 V;
VHR-1 = 98.3%;
VHR-2 = 93.2%.

Example 6

| | | |
|---|---|---|
| 2-HHB (F, F)—F | (2-1) | 8% |
| 3-HHB (F, F)—F | (2-1) | 10% |
| 4-HHB (F, F)—F | (2-1) | 3% |
| 3-H2HB (F, F)—F | (2-2) | 10% |
| 5-H2HB (F, F)—F | (2-2) | 14% |
| 2-HHB (F)—OCF3 | (2-4) | 3% |
| 3-HHB (F)—OCF3 | (2-4) | 5% |
| 2-HH x B (F, F)—F | (3-1) | 7% |
| 3-HH x B (F, F)—F | (3-1) | 10% |
| 5-HH x B (F, F)—F | (3-1) | 4% |
| 3-HH x B (F)—F | (3-2) | 2% |
| 3-HH x B (F)—OCF3 | (3-3) | 2% |
| 3-BB (F, F) x B (F, F)—F | (4-1) | 10% |
| 2-HHBB (F, F)—F | (6-1) | 3% |
| 3-HHBB (F, F)—F | (6-1) | 3% |
| 4-HHBB (F, F)—F | (6-1) | 3% |
| 3-HH2BB (F, F)—F | (6-2) | 3% |

NI = 85.1° C.;
$T_c$ < −30° C.;
$\Delta n$ = 0.085;
$\eta$ (20° C.) = 29.7 mPa · s;
$\eta$ (−10° C.) = 303 mPa · s;

-continued

Vth = 1.24 V;
VHR-1 = 98.6%;
VHR-2 = 93.1%.

Example 7

| | | |
|---|---|---|
| 2-HHB (F, F)—F | (2-1) | 8% |
| 3-HHB (F, F)—F | (2-1) | 10% |
| 4-HHB (F, F)—F | (2-1) | 3% |
| 3-H2HB (F, F)—F | (2-2) | 9% |
| 4-H2HB (F, F)—F | (2-2) | 4% |
| 5-H2HB (F, F)—F | (2-2) | 10% |
| 3-HH2B (F, F)—F | (2-3) | 3% |
| 2-HH × B (F, F)—F | (3-1) | 7% |
| 3-HH × B (F, F)—F | (3-1) | 10% |
| 3-HH × B (F)—F | (3-2) | 2% |
| 3-HH × B (F)—OCF3 | (3-3) | 2% |
| 3-BB (F, F) × B (F, F)—F | (4-1) | 13% |
| 3-BB (F, F) × B (F)—F | (4-2) | 2% |
| 3-BB (F, F) × B (F)—OCF3 | (4-3) | 2% |
| 2-HHBB (F, F)—F | (6-1) | 3% |
| 3-HHBB (F, F)—F | (6-1) | 3% |
| 4-HHBB (F, F)—F | (6-1) | 3% |
| 3-HH2BB (F, F)—F | (6-2) | 3% |
| 4-HH2BB (F, F)—F | (6-2) | 3% |

NI = 81.0° C.;
$T_c < -30°$ C.;
$\Delta n = 0.089$;
$\eta$ (20° C.) = 30.4 mPa · s;
$\eta$ (-10° C.) = 308 mPa · s;
Vth = 1.20 V;
VHR-1 = 98.5%;
VHR-2 = 93.5%.

Example 8

| | | |
|---|---|---|
| 2-HHB (F, F)—F | (2-1) | 5% |
| 3-HHB (F, F)—F | (2-1) | 10% |
| 3-H2HB (F, F)—F | (2-2) | 10% |
| 5-H2HB (F, F)—F | (2-2) | 5% |
| 2-HHB (F)—OCF3 | (2-4) | 5% |
| 3-HHB (F)—OCF3 | (2-4) | 5% |
| 2-HH × B (F, F)—F | (3-1) | 5% |
| 3-HH × B (F, F)—F | (3-1) | 10% |
| 5-HH × B (F, F)—F | (3-1) | 4% |
| 3-HH × B (F)—F | (3-2) | 2% |
| 3-HH × B (F)—OCF3 | (3-3) | 2% |
| 3-BB (F, F) × B (F, F)—F | (4-1) | 13% |
| 3-HB (F) B (F, F)—F | (5-1) | 2% |
| 3-HB (F, F) B (F)—F | (5-2) | 2% |
| 2-HHBB (F, F)—F | (6-1) | 3% |
| 3-HHBB (F, F)—F | (6-1) | 3% |
| 4-HHBB (F, F)—F | (6-1) | 3% |
| 3-HH2BB (F, F)—F | (6-2) | 3% |
| 4-HH2BB (F, F)—F | (6-2) | 3% |
| 3-HBB (F, F)—F | (8-1) | 3% |
| 3-H2BB (F, F)—F | (8-2) | 2% |

NI = 82.7° C.;
$T_c < 30°$ C.;
$\Delta n = 0.092$;
$\eta$ (20° C.) = 29.1 mPa · s;
$\eta$ (-10° C.) = 295 mPa · s;
Vth = 1.14 V;
VHR-1 = 98.6%;
VHR-2 = 93.4%.

Example 9

| | | |
|---|---|---|
| 2-HHB (F, F)—F | (2-1) | 8% |
| 3-HHB (F, F)—F | (2-1) | 10% |
| 3-H2HB (F, F)—F | (2-2) | 5% |
| 5-H2HB (F, F)—F | (2-2) | 8% |
| 2-HHB (F)—OCF3 | (2-4) | 5% |
| 3-HHB (F)—OCF3 | (2-4) | 5% |
| 2-HH × B (F, F)—F | (3-1) | 7% |
| 3-HH × B (F, F)—F | (3-1) | 10% |
| 5-HH × B (F, F)—F | (3-1) | 4% |
| 3-BB (F, F) × B (F, F)—F | (4-1) | 18% |
| 2-HHBB (F, F)—F | (6-1) | 3% |
| 3-HHBB (F, F)—F | (6-1) | 3% |
| 4-HHBB (F, F)—F | (6-1) | 3% |
| 3-HH2BB (F, F)—F | (6-2) | 3% |
| 4-HH2BB (F, F)—F | (6-2) | 3% |
| 3-HBB (F, F)—F | (8-1) | 3% |
| 101-HH2B (F, F)—F | (-) | 2% |

NI = 80.4° C.;
$T_c < -30°$ C.;
$\Delta n = 0.093$;
$\eta$ (20° C.) = 30.2 mPa · s;
$\eta$ (-10° C.) = 304 mPa · s;
Vth = 1.15 V;
VHR-1 = 98.8%;
VHR-2 = 93.2%.

The composition of the present invention satisfies plurality of the characteristics, i.e., wide temperature range of a nematic phase, low viscosity, suitable optical anisotropy, low threshold voltage and high specific resistance, in a properly balanced manner. The element of the present invention comprises this composition. The element comprising the composition having an optical anisotropy of 0.08 to 0.12 has high contrast ratio, low electric power consumption and high voltage holding ratio and is suitable for a transmission AM element.

What is claimed is:

1. A liquid crystal composition comprising at least one compound selected from the compounds represented by formula (1) as a first component, at least one compound selected from the compounds represented by formulas (2) and (3) as a second component, at least one compound selected from the compounds represented by formulas (4) and (5) as a third component and at least one compound selected from the compounds represented by formulas (6) and (7) as a fourth component:

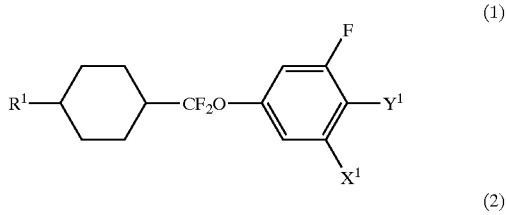

(1)

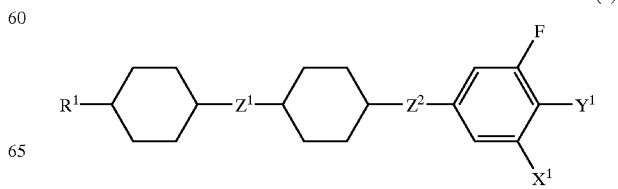

(2)

-continued

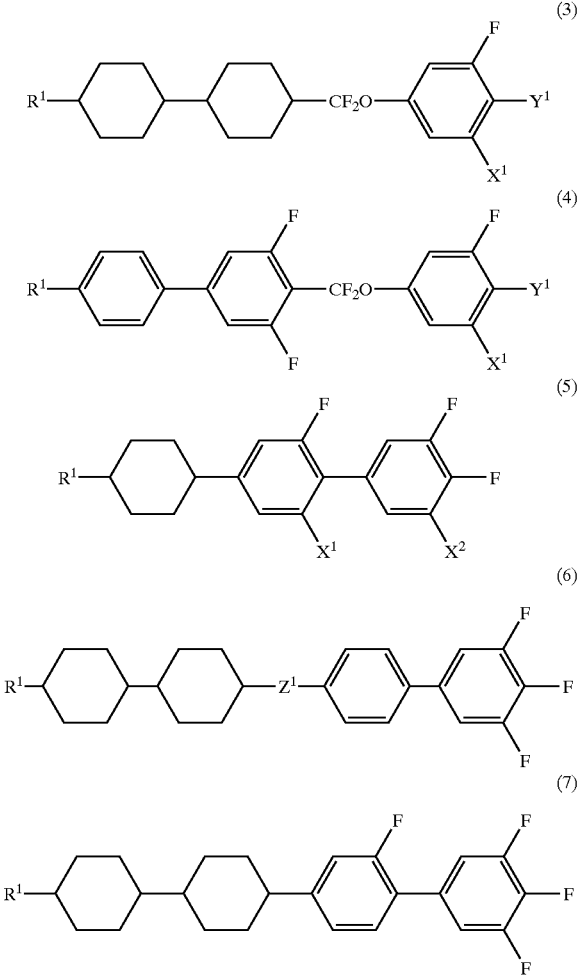

wherein, $R^1$ represents alkyl; $Z^1$ and $Z^2$ each independently represent a single bond or —$(CH_2)_2$—; $X^1$ and $X^2$ each independently represent hydrogen or fluorine; and $Y^1$ represents fluorine or —$OCF_3$.

2. The liquid crystal composition described in claim 1 which contains from 3 to 20% by weight of the first component, from 40 to 80% by weight of the second component, from 3 to 30% by weight of the third component and from 5 to 30% by weight of the fourth component, each based on the total weight of the composition.

3. The liquid crystal composition described in claim 1 which further comprises at least one compound selected from the compounds represented by formula (8) as a fifth component:

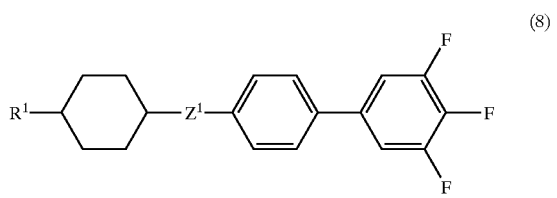

wherein $R^1$ represents alkyl; and $Z^1$ represents a single bond or —$(CH_2)_2$—.

4. The liquid crystal composition described in claim 2 which further comprises at least one compound selected from the compounds represented by formula (8) as a fifth component:

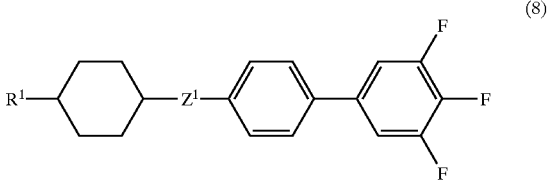

wherein $R^1$ represents alkyl; and $Z^1$ represents a single bond or —$(CH_2)_2$—.

5. The liquid crystal composition described in claim 3 which contains from 3 to 15% by weight of the fifth component, based on the total weight of the composition.

6. The liquid crystal composition described in claim 4 which contains from 3 to 15% by weight of the fifth component, based on the total weight of the composition.

7. The liquid crystal composition described in claim 2, which has an optical anisotropy of 0.08 to 0.12.

8. The liquid crystal composition described in claim 5, which has an optical anisotropy of 0.08 to 0.12.

9. The liquid crystal composition described in claim 6, which has an optical anisotropy of 0.08 to 0.12.

10. A liquid crystal composition comprising at least one compound selected from the compounds represented by formula (2), at least one compound selected from the compounds represented by formula (3), at least one compound selected from the compounds represented by formula (4) and at least one compound selected from the compounds represented by formula (6):

-continued

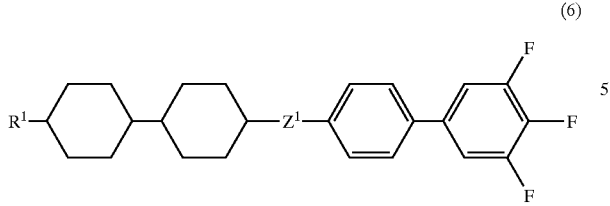

(6)

wherein, R¹ represents alkyl, Z¹ and Z² each independently represents a single bond or —(CH₂)₂—, X¹ represents hydrogen or fluorine, and Y¹ represents fluorine or —OCF₃.

11. The liquid crystal composition described in claim 10 which contains from 20 to 70% by weight of at least one compound selected from the compounds represented by formula (2), from 10 to 40% by weight of at least one compound selected from the compounds represented by formula (3), from 3 to 30% by weight of at least one compound selected from the compounds represented by formula (4) and from 5 to 30% by weight of at least one compound selected from the compounds represented by formula (6), each based on the total weight of the composition.

12. The liquid crystal composition described in claim 10 which further contains at least one compound selected from the compounds represented by formulas (5) and (8):

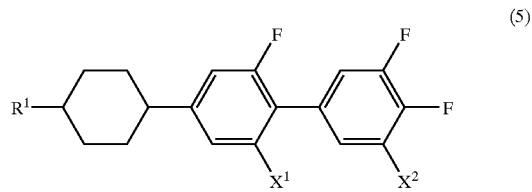

(5)

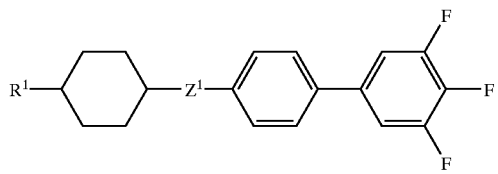

(8)

wherein, R¹ represents alkyl, Z¹ represents a single bond or —(CH₂)₂—, and X¹ and X² each independently represent hydrogen or fluorine.

13. The liquid crystal composition described in claim 11 which further contains at least one compound selected from the compounds represented by formulas (5) and (8):

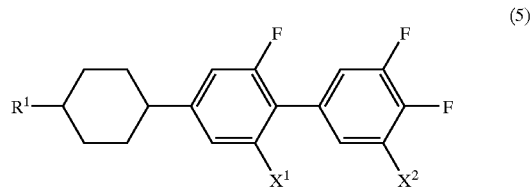

(5)

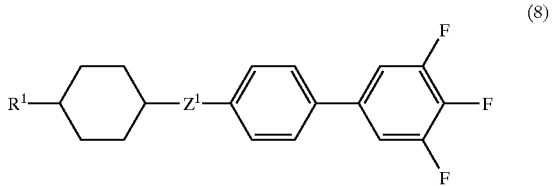

(8)

wherein, R¹ represents alkyl, Z¹ represents a single bond or —(CH₂)₂—, and X¹ and X² each independently represent hydrogen or fluorine.

14. The liquid crystal composition described in claim 12 which contains from 3 to 25% by weight of at least one compound selected from the compounds represented by formulas (5) and (8), based on the total weight of the composition.

15. The liquid crystal composition described in claim 13 which contains from 3 to 25% by weight of at least one compound selected from the compounds represented by formulas (5) and (8), based on the total weight of the composition.

16. The liquid crystal composition described in claim 11 which has an optical anisotropy of 0.08 to 0.12.

17. The liquid crystal composition described in claim 14 which has an optical anisotropy of 0.08 to 0.12.

18. The liquid crystal composition described in claim 15 which has an optical anisotropy of 0.08 to 0.12.

19. A liquid crystal display element comprising the liquid crystal composition described in claim 1.

20. A liquid crystal display element comprising the liquid crystal composition described in claim 2.

21. A liquid crystal display element comprising the liquid crystal composition described in claim 3.

22. A liquid crystal display element comprising the liquid crystal composition described in claim 4.

23. A liquid crystal display element comprising the liquid crystal composition described in claim 5.

24. A liquid crystal display element comprising the liquid crystal composition described in claim 6.

25. A liquid crystal display element comprising the liquid crystal composition described in claim 7.

26. A liquid crystal display element comprising the liquid crystal composition described in claim 8.

27. A liquid crystal display element comprising the liquid crystal composition described in claim 9.

28. A liquid crystal display element comprising the liquid crystal composition described in claim 10.

29. A liquid crystal display element comprising the liquid crystal composition described in claim 11.

30. A liquid crystal display element comprising the liquid crystal composition described in claim 12.

31. A liquid crystal display element comprising the liquid crystal composition described in claim 13.

32. A liquid crystal display element comprising the liquid crystal composition described in claim 14.

33. A liquid crystal display element comprising the liquid crystal composition described in claim 15.

34. A liquid crystal display element comprising the liquid crystal composition described in claim 16.

35. A liquid crystal display element comprising the liquid crystal composition described in claim 17.

36. A liquid crystal display element comprising the liquid crystal composition described in claim 18.

* * * * *